United States Patent [19]

Wagner

[11] 3,933,756

[45] Jan. 20, 1976

[54] PROCESS OF PREPARATION OF SYNTHETIC RESINS BY REACTING A CROSS-LINKED ISOCYANATE POLYADDITION PRODUCT WITH LOW MOLECULAR WEIGHT POLYISOCYANATE FOLLOWED BY REACTION WITH AN AMINO ALKYL SILANE

[75] Inventor: Kuno Wagner, Leverkusen, Germany

[73] Assignee: Bayer Aktiengesellschaft, Leverkusen Bayerwerk, Germany

[22] Filed: Feb. 3, 1975

[21] Appl. No.: 546,492

Related U.S. Application Data

[63] Continuation of Ser. No. 380,421, July 18, 1973, abandoned.

[30] Foreign Application Priority Data

Aug. 5, 1972 Germany............................ 2238741

[52] U.S. Cl. ....................260/75 NE; 260/77.5 AA; 260/77.5 AM
[51] Int. Cl.² ......................................... C08G 18/08
[58] Field of Search... 260/75 NE, 77.5 AA, 46.5 E, 260/77.5 AM

[56] References Cited

UNITED STATES PATENTS

| 3,164,439 | 1/1965 | Muhlhausen et al. ........... 260/75 NE |
| 3,326,861 | 6/1967 | Sandridge .................... 260/77.5 AA |
| 3,711,445 | 1/1973 | Chu et al. .................... 260/77.5 AM |
| 3,738,946 | 6/1973 | Frulla et al. ................. 260/77.5 AA |

OTHER PUBLICATIONS

Gould, *Mechanism & Structure In Organic Chemistry,* Holt, NY, 1959, pp. 57–60.

*Primary Examiner*—M. J. Welsh
*Attorney, Agent, or Firm*—Joseph C. Gil; Gene Harsh

[57] ABSTRACT

Isocyanate polyaddition products which are cross-linked via allophanate, biuret, or uretdione imine groups are linearized by reacting them in the presence of polar solvents with low molecular weight polyisocyanates at temperatures between 90° and 200°C and then preferably reacting the linearized product with amino alkyl silane derivatives to prepare products which are easily cross-linked by atmospheric moisture to form soft highly elastic films.

9 Claims, No Drawings

PROCESS OF PREPARATION OF SYNTHETIC RESINS BY REACTING A CROSS-LINKED ISOCYANATE POLYADDITION PRODUCT WITH LOW MOLECULAR WEIGHT POLYISOCYANATE FOLLOWED BY REACTION WITH AN AMINO ALKYL SILANE

This is a continuation of application Ser. No. 380421, filed July 18, 1973, and now abandoned.

This invention relates to a process for the production of linear polyurethanes which preferably still contain NCO-groups and/or silylized urea and/or biuret groups from polyurethane elastomers or polyurethane foams which are cross-linked via biuret, allophanate or uretoneimine groups by means of new linearizing modification reactions in polar solvents.

Owing to the ever increasing quantity of polyurethane waste produced in the working up of polyurethane products, there is great interest in finding a technically simple process by which polyurethane waste (e.g. elastomer waste, foam, foam flakes, films, porous foils, threads, etc.) can be converted into products which can be used again in the production process.

Previously the only known process depended on the fact that high-molecular weight polyurethanes, when subjected to prolonged heating in polar solvents, undergo splitting of the urethane and/or ester bonds and are degraded rather unselectively into low-molecular weight products.

This invention provides a new process for working up cross-linked polyurethanes by the action of polyisocyanates. According to present day views about the reactivity of the Zerewitinoff active hydrogen atoms present in urethane and urea groups towards any polyisocyanates, it was expected that the degree of cross-linking of diisocyanate polyaddition products which have already been cross-linked but still contain numerous urethane or urea groups would be considerably increased by further treatment with polyisocyanates.

It has surprisingly been found, however, that any elastomers which contain urethane and/or urea groups and are cross-linked via allophanate and/or biuret groups or uretone imine groups, by numerous variations of the diisocyanate polyaddition process, do not undergo further cross-linking when subjected to the action of any difunctional or higher functional polyisocyanates in the presence of polar solvents but are directly converted in a smooth reaction into readily soluble, linearized macropolyisocyanates which, if desired, can easily be reacted with aminoalkyl alkoxysilane derivatives to yield polyaddition products with silyl-urea groups or biuret groups which can be cold hardened by moisture. Cellular foams obtained from bifunctional hydroxyl compounds and optionally modified polyisocyanates react in a completely analogous manner.

In both cases, linear, high-molecular weight polyurethanes which contain at least two NCO-groups (i.e. macro-polyisocyanates) are obtained in quantitative yields with selective removal of cross-linking allophanate or biuret segments.

This invention therefore relates to a process for the linearization of cross-linked diisocyanate polyaddition products, characterized in that the cross-linked high-molecular weight polyaddition products are reacted in the presence of polar solvents, with low-molecular weight polyisocyanates and optionally modified polyisocyanates at temperatures of between 90° and 200°C., preferably 110° to 140°C.

The resulting soluble, uncross-linked macropolyisocyanates may, if desired, be further modified with aminoalkyl alkoxy-silanes.

As analytical investigations have shown, high quality macropolyisocyanates which have excellent film-forming properties and internal viscosities covering the entire technically interesting range for foils and coatings of 0.35 to 1.2 can be obtained by the process according to the invention of linearizing decomposition of cross-linked diisocyanate polyaddition products, in particular within the temperature range of 110° – 140°C. By "internal viscosity" (inherent viscosity) is meant the coefficient $$\eta = \frac{\ln \eta_{rel}}{C}$$

in which $\eta_{rel}$ is the relative viscosity of the solution of polymer in hexamethyl phosphoramide at 20°C. and C is the concentration in g/100 ml of solvent.

This invention not only enables macropolyisocyanates with high-quality film properties to be produced but also provides the industry which produces various cross-linked polyurethanes with a process by which polyurethane waste such as elastomer waste, foam flakes and waste products of foils and elastomer threads can be refined to a high degree. It is particularly advantageous to subject the macropolyisocyanates obtained according to the invention to a further reaction with various aminoalkyl silane derivatives, preferably α-aminomethyl silane derivatives, if desired, in admixture with the monomeric polyisocyanates which are not built into the molecule in the linearization process according to the invention. The process therefore corresponds in principle to that described in U.S. Ser. Nos. 303,192 and 303,671. By means of the process, the NCO-groups of the macropolyisocyanates, which are not in themselves stable in storage, can be stabilized by introduction into the macromolecule of one or more silyl urea groups which are capable of cross-linking.

The process according to the invention is based on the finding that diisocyanate polyaddition products which have been cross-linked via allophanate, biuret or uretone imine groups are linearized in polar solvents in the presence of monomeric polyisocyanate, possibly by way of a primary biuret interchange or allophanate interchange by the monomeric diisocyanate. By linearization is meant in this context the elimination of the three-dimensional transverse cross links even though the linearized macropolyisocyanate may nevertheless still contain short chain allophanate or biuret branches.

The linearization reaction according to the invention theoretically proceeds in accordance with the following reaction scheme:

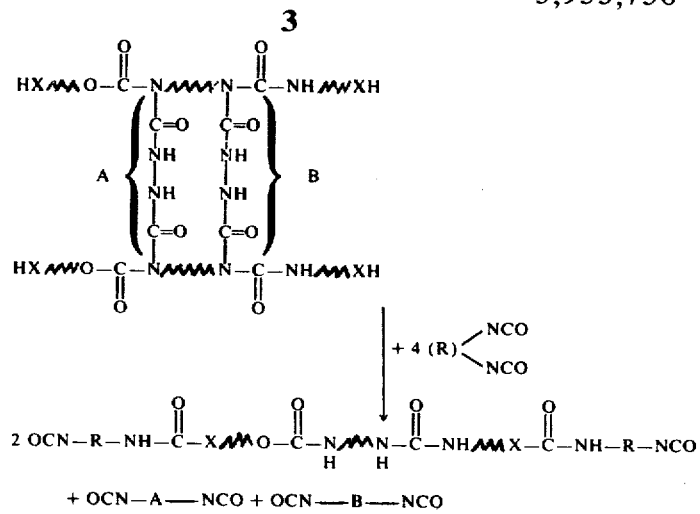

In the above scheme,

X = O, N;
A = an allophanate segment,
B = a biuret segment,
R = the divalent radical of a low-molecular weight diisocyanate;
∿ represents a polyester, polyether, polyester urethane, polyether urethane or polyester amide segment.

As represented in the reaction scheme, linearizing decomposition of any cross-linked diisocyanate polyaddition product results in compounds with terminal NCO groups as a result of the reaction with low-molecular weight polyisocyanates. The process according to the invention therefore leads to the formation of technically interesting very high molecular weight macropolyisocyanates. These macropolyisocyanates are advantageously subsequently reacted with aminoalkyl alkoxysilane derivatives to convert them into high-molecular weight polyaddition products containing silylized urea groups or silylized biuret groups which can be cross-linked in the cold by moisture with formation of siloxane bridges.

The principle of linearizing decomposition of cross-linked diisocyanate polyaddition products in the presence of low-molecular weight polyisocyanates is quite generally applicable, i.e. polyurethane elastomers, cellular substrates (foams or foam flakes), films, microporous foils, crosslinked elastomer threads with any segmental structure, i.e. those containing polyester, polyether, polycarbonate, polyamide, polythioether, polyacetal, polyurethane, polyurea or polyhydrazodicarbonamide segments, etc. as well as cross-linked polyurethane ionomers can be converted into macropolyisocyanates by this process.

The materials preferably used for the process are soft-elastic to hard-elastic granulated elastomers, cellular polyurethane foam flakes, porous, microporous or non-porous foils, disintegrated elastomer threads, etc. Diisocyanate polyaddition products which are cross-linked via allophanate or biuret groups and which have been prepared from linear α-ω-dihydroxy compounds or α,ω-diamino compounds, chain-lengthening agents such as water, bifunctional alcohols, bifunctional dicarboxylic acids, bifunctional diamines, hydrazines, amino alcohols, etc. and diisocyanates such as naphthylene-1,5-diisocyanate, 4,4'-diisocyanatodiphenylmethane, tolylene-2,4-diisocyanate, tolylene-2,6-diisocyanate, mixtures of isomeric tolylene diisocyanates, hexamethylene diisocyanate, 1-isocyanato-3,3,5-trimethyl-5-isocyanato-methylcyclohexane, m- and p-xylylene diisocyanate or 2,4,4-trimethyl-hexamethylene diisocyanate, etc. by known processes in an equivalent NCO-/OH or NCO/NH₂ or NCO(NH₂ + OH) ratio of>1, preferably 1.03 to 1.5 and especially 1.04 – 1.20, are particularly preferred. Cross-linked diisocyanate polyaddition products of this kind have been described, for example in DRP No. 728,981, by O. Bayer in Angew. Chem. 60, 257 (1948) and E. Muller in Angew. Makr. Chemie 75–86 (1970), in DAS No. 1,226,071, DAS No. 1,131,033 and U.S. Pat. No. 3,399,167 and in Kunststoff-Handbuch, volume VII, Carl Hanser Verlag, Munich 1966, pages 35 et seq. 110, 440, 442, 445, 449, 475, 486, 518, 566, 588 and 654.

Any monomeric and modified diisocyanates and polyisocyanates are suitable in principle for the linearizing decomposition according to the invention of cross-linked polyurethanes to produce macropolyisocyanates. The following polyisocyanates are preferred:

tetramethylene-1,4-diisocyanate; pentamethylene-1,5-diisocyanate; hexamethylene-1,6-diisocyanate; 2,4,4-trimethyl-hexamethylene-1,6-diisocyanate; dodecamethylene-1,12-diisocyanate; 1,2-diisocyanatomethylcyclobutane; dicyclohexyl-4,4'-diisocyanate; dicyclohexyl-methane-4,4'-diisocyanate; p- and m-xylylene diisocyanate; lysine-methylester diisocyanate; 1-isocyanato-3,3,5-trimethyl-5-isocyanatomethylcyclohexane; 1-methyl-2,4-diisocyanato-cyclohexane and isomers thereof; tolylene-2,4-diisocyanate; tolylene-2,6-diisocyanate; 4,4'-diisocyanatodiphenylmethane; 4,4'-diisocyanatodiphenylether; naphthylene-1,5-diisocyanate and NCO-telomers of the above mentioned diisocyanates of the kind described in French Pat. No. 1,593,137, in particular those of hexamethylene diisocyanate and 1-isocyanato-3,3,5-trimethyl-5-isocyanatomethyl-cyclohexane with vinyl acetate, vinyl chloride, styrene, methyl acrylate, methyl methacrylate, and butyl acrylate. Diisocyanates which contain semicarbazide groups such as those mentioned in German Offenlegungsschrift no. 1,720,711 are also suitable, especially those obtained from 2 mols of hexamethylene diisocyanate or 1-isocyanato-3,3,5-trimethyl-5-isocyanatomethyl-cyclohexane and 1 mol of N,N-dimethyl-hydrazine.

Other modified tri-, tetra- and higher functional polyisocyanates and their solutions in monomeric diisocyanates may be used in the same way for the reaction according to the invention, e.g. polyisocyanates which contain urethane, allophanate, biuret or carbodiimide groups or acylated isocyanurate or uretone imine groups.

The quantity of low-molecular weight polyisocyanate used for the preparation according to the invention of macropolyisocyanates by linearizing decomposition of high-molecular weight, cross-linked polyaddition products is not critical and may vary within the widest limits. The process according to the invention may be carried out with as little as 0.4% by weight of monomeric diisocyanate but also with up to 600% by weight of monomeric diisocyanate (based on the polyaddition product). It is surprisingly preferable to use as little as 0.8 to 10% by weight of monomeric polyisocyanates, based on the polyaddition product which is to be linearized. In that case, the products obtained after completed reaction of the macropolyisocyanates and monomeric polyisocyanates with aminoalkyl alkoxysilane derivatives are valuable mixtures of polyaddition products which contain high proportions by weight of silylized urea or biuret groups, and low-molecular weight silyl ureas of the low-molecular weight polyisocyanates used for linearization.

Suitable solvents for the process according to the invention are highly polar organic liquids such as dimethyl formamide, dimethylacetamide, tetramethyl urea, dimethyl sulphoxide, N-methyl pyrrolidone, glycol carbonate, caprolactone and butylactone.

NCO-groups are not stable in macrodiisocyanates which have an average molecular weight of 20,000 to 80,000 because even in the course of short periods of storage in polar solvents, in particular in dimethylformamide, they readily react with traces of moisture or form amidines. Since the concentration of NCO-groups is extremely small in these macrodiisocyanates (theoretical values for an average molecular weight of 50,000 = 0.168 g. of NCO/100 g: in 20% solutions only 0.0336 g. of NCO/100 g. of solution), the reaction of the NCO-groups with excess impurities such as water is exclusively one of chain breaking resulting in amino end groups, i.e. no chain-lengthening via urea groups takes place. If these macrodiisocyanates are subjected to prolonged storage, therefore, they are converted into macromolecules which no longer contain any reactive groups capable of being cross-linked.

The reaction of the NCO-groups of the macropolyisocyanate in accordance with the following reaction scheme

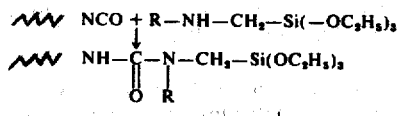

leads to a new end group which is completely stable towards the impurities mentioned above since even large quantities of water at the most only lead to the following end groups:

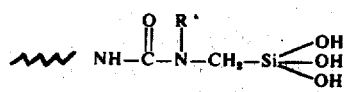

in other words, end groups with silanol groupings which are also capable of undergoing further condensation with polysiloxane formation. An interesting variation of the process according to the invention consists in carrying out the reaction in such a manner that the macrodiisocyanates or their mixtures with low-molecular weight diisocyanates react statistically only unilaterally with the aminoalkyl silanes, leaving half the NCO-groups to react with impurities. Exceptionally stable modified diisocyanate polyaddition products which have extremely high storage stability in polar solvents are obtained in this way. These products are capable of undergoing further condensation reaction by way of siloxane bridges and can be converted into high molecular weight compounds with comb structures by controlled addition of $H_2O$, e.g. in accordance with the following reaction scheme:

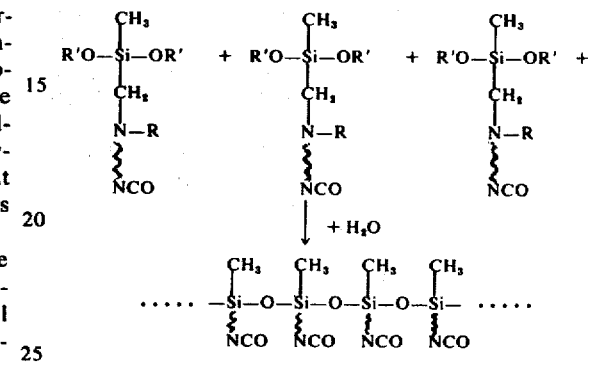

In this variation of the process, any alcohols R-OH may be added to the solutions after statistical unilateral reaction of the macropolyisocyanates with aminoalkyl silanes, polycondensates which have comb structures and are free from amino groups and contain inert urethane side groups as represented by the following idealized formula

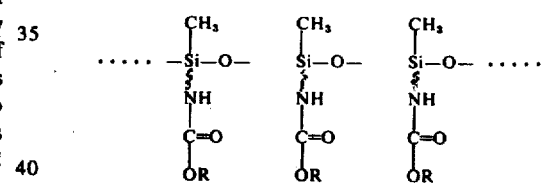

being obtained. Polyaddition polycondensates which have such comb structures enable solutions with substantially reduced viscosities to be obtained, i.e. valuable low-viscosity solutions with increased concentrations of solids can be prepared.

Linearizing decomposition of cross-linked diisocyanate polyaddition products to produce macrodiisocyanates can easily be carried out even in the presence of large quantities by weight of very high molecular weight but still soluble diisocyanate polyaddition products, and again this can be achieved without cross-linking. This variation of the process enables a mixture of various macrodiisocyanates to be prepared, which may subsequently be converted into novel mixed condensate blocks by silyl modification and reaction with water.

Aminoalkyl silane derivatives of various constitutions which are monofunctional, bifunctional or trifunctional in the amine or alkoxy silane portion of the molecule are suitable for the preferred reaction of the macropolyisocyanates according to the invention. The preferred aminoalkyl silane derivatives to be used are the α-aminomethyl alkoxysilane derivatives of the following formulae mentioned in U.S. Serial Nos. 303,192 and 303,671:

(1) 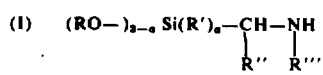

(II) 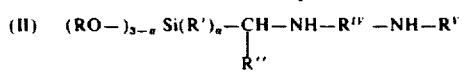

or (III)

wherein
R represents a $C_1$—$C_{18}$ alkyl radical or $C_4$—$C_{14}$ cycloalkyl radical or a phenyl radical,
R' represents an optionally halogenated or cyanosubstituted $C_1$—$C_{10}$ alkyl, $C_4$—$C_{10}$ cycloalkyl or $C_6$—$C_{10}$ aryl radical,
R'' represents a hydrogen atom or a methyl or phenyl radical,
R''' represents a hydrogen atom or an optionally halogenated or cyanosubstituted $C_1$—$C_{18}$ alkyl, $C_4$—$C_{14}$ cycloalkyl or $C_6$—$C_{14}$ aryl radical,
$R^{IV}$ represents a divalent aliphatic, cycloaliphatic, araliphatic or aromatic hydrocarbon radical containing 2 to 16 carbon atoms, and
$R^V$ represents hydrogen or

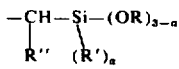

$a = 0$, 1 or 2 and $n = 1$—7.

The following α-aminomethyl alkoxysilanes of formula (I) which are monofunctional in the amine portion are particularly suitable examples for the reaction with macropolyisocyanates:

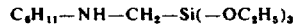

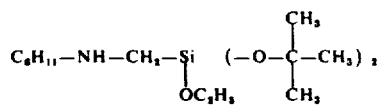

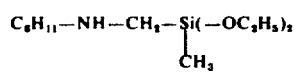

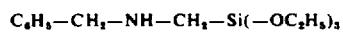

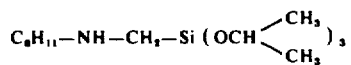

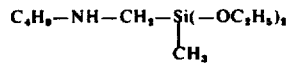

These α-aminomethyl silane derivatives may be prepared by the methods described in U.S. Pat. Nos. 3,673,233 and 3,676,478.

In general, they may be obtained, for example, by reacting amines of the formula R'''—$NH_2$ with, for example, chloromethyltriethoxysilane; bromomethyltriethoxysilane; methyl-chloromethyl diethoxysilane; dimethyl-chloromethyl-ethoxysilane; methyl-bromomethyldiethoxysilane or methyl-bromomethyl-di-n-propoxysilane.

The following α-aminomethyl alkoxysilanes of formula (II) which are bifunctional in the amine portion are examples of α-aminomethyl alkoxysilanes of this kind which are particularly suitable for the reaction with the macropolyisocyanates according to the invention:

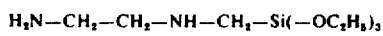

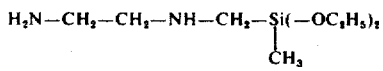

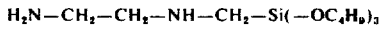

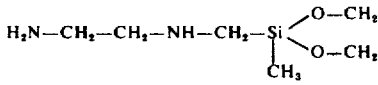

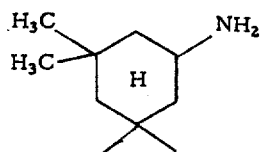

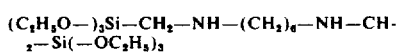

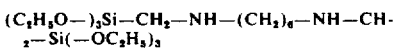

These silane derivatives may be prepared by the methods described in U.S. Pat. Nos. 3,673,233 and 3,676,478. For the reaction of the macropolyisocyanates according to the invention, these compounds which are bifunctional in the amine portion are always reacted in a two-fold to three-fold excess, based on the total quantity of NCO present in the solution, in order to prevent cross-linking reactions.

Aminoalkyl silane derivatives of formula (III), which are substantially less reactive with moisture than those of formulae (I) and (II), are also suitable for the reaction with the macroisocyanates according to the invention. The following are examples of preferred compounds of this kind:

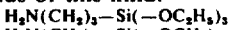
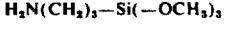

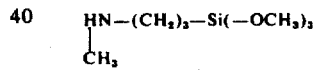

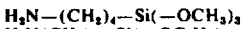
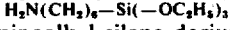

Aminoalkyl silane derivatives of this kind are commercial products and are prepared according to known methods by reactions of addition of unsaturated amines or nitriles to silanes which are capable of addition, the reactions being carried out in the presence of platinum salts as catalysts.

The aminoalkyl silane derivatives are most suitably added to the macrodiisocyanate after linearization has been carried out, and in such quantities that both the macropolyisocyanate and the unbound monomeric polyisocyanate react to form the corresponding silyl ureas. For the production of coatings, lacquers, films, microporous foils, etc. from the products according to the invention, the dissolved low molecular weight ureas, biurets, allophanates or isocyanurates which are substituted with ethoxy silane groups constitute valuable chain-lengthening and cross-linking agents for the cross-linking reaction of the modified high-molecular weight and low-molecular weight polyisocyanates via siloxane segments which is effected by moisture.

The products of the process may be stabilized with alcohols and special solvents, acid additives, etc. as described in German Offenlegungsschrift 2,151,893 and U.S. Ser. Nos. 303,192 and 303,671.

The preferred stabilizers are monofunctional alcohols such as isobutanol, isopropanol and tert. butanol. Tert. butanol and isopropanol are especially preferred. More acidic alcohols such as chloroethanol, trichloroethanol, p-chlorophenol and hexachloroisopropanol are also important as highly active additives. Minor quantities of bifunctional and polyfunctional secondary and tert. alcohols may also be included to act as stabilizing plasticizers. The additional stabilizing effect provided by the presence of organic carboxylic acids or of compounds which split off acids is very advantageous for the practical application of the products. The following acid, stabilizing additives which rapidly accelerate hardening by moisture are particularly preferred:

Acetic acid anhydride, acetic acid, formic acid, propionic acid, butyric acid, trichloroacetic acid, p-tolluene-sulphonic acid esters, dimethylcarbamic acid chloride, benzoyl chloride, N-phenyl-carbamic acid chloride, chloroacetaldehyde, chloral, pripionic acid anhydride, mixed anhydrides of lower carboxylic acids, cyclic anhydrides such as maleic acid anhydride, phthalic acid anhydride, tetrahydrophthalic acid anhydride, semiesters of cyclic acid anhydrides, e.g. those obtained from one mol of phthalic acid anhydride and one mol of methanol, butanol or isopropanol, or semiesters of these cyclic acid anhydrides with glycols, which semiesters contain both an OH group and a carboxyl group in their molecule, e.g. those obtained from one mol of maleic acid anhydride or hexahydrophthalic acid anhydride and one mol of glycol, 1,3-propylene glycol or butane-1,4-diol. The addition of small quantities of readily hydrolyzable esters such as boric acid esters, diethyl oxalate or ethyl orthoformate or reaction products of p-toluene-sulphonyl isocyanate with alcohols or amines or the addition of small quantities of p-toluene-sulphonyl isocyanate, acyl isocyanates such as benzoyl isocyanate or hydrochlorides of trimethylamine, triethylamine, etc. may also be advantageous. These compounds, which act both as stabilizers and as accelerators for the cross-linking process, are preferably added in quantities of 0.2 to 5% to the solutions of the products of the process in the preferred alcohol mixtures or solutions in stabilizing solvents such as chloroform, methylene chloride, perchloroethylene, trichloroethylene or dimethylformamide.

Known active or inactive fillers such as chalk, talcum, silica, silica gel, quartz powder, titanium dioxide, iron oxides, zirconium silicate, calcium sulphate, aluminium oxide, magnesium oxide, carbon black, graphite, sand and known finely disperse fillers based on silicon oxide may also be added to the preferably stabilized products according to the invention or their mixtures, but all these fillers may only be used in their anhydrous state.

The products according to the invention, especially in their stabilized form, and their solutions, are high-quality substances which are extremely readily cross-linked in the cold, i.e. without application of heat, by atmospheric moisture or by masked compounds which split off water, and they can be worked up into various end products such as elastic or hard cross-linked polymers with high chemical resistance and temperature resistance. They may be used, for example, for the production of highly elastic films, very lightfast and chemically resistant lacquers and coatings on any supports and for the production of rubbery elastic products, fibers and sealing compounds of any kind. They may also be used for embedding electrical elements, for insulating against cold or heat, for laminating various pigments, for elastically enveloping various water-soluble plant nutrient salts, as corrosion protective agents, for bonding metals, e.g. silver, aluminium and copper, as powerful adhesives which are free from cross-linking and impart water-repellency, as rapidly cross-linking surface-active compounds, as laminating and gumming agents for fibers and fleeces, as fleece binders and high-quality adhesives. etc. Many different synthetic resin segments can be cross-linked via siloxane bridges and combined with each other by using selected mixtures of different products of the process. The stabilized products according to the invention which can be activated on application can be used for impregnating any synthetic or natural fibers or threads or covering them with a non-sticky coating by new and economical methods so that they can be wound on rollers very quickly without sticking. This invention also provides the possibility of elegant methods of rapid immersion lacquering, immersion coating for the insulation of cables and the production of rapidly reacting cable sheaths for lacquering wires, using rapidly cross-linking substances with good adhesive properties and great bonding power. Another interesting possibility of application is the rapid and non-sticky enveloping of pigments which contain moisture.

The products according to the invention may also be mixed with known organopolysiloxanes which can be cross-linked, e.g. those which are prepared by the condensation of chlorosilanes and alkoxy silanes by cohydrolysis with water or by polymerization of cyclic organosiloxanes using alkaline or acid catalysts, which products are then cross-linked, e.g. with $\alpha,\omega$-dihydroxy-polydimethylsiloxanes. The products of the process are also eminently suitable for matrix reactions based on the principles of U.S. Application Ser. No. 017,349 and Offenlegungsschriften DOS 1 911 643, DOS 1 911 644 and DOS 1 911 645 and for impregnating foam resins in a manner analogous to U.S. Ser. No. 155,284.

Hardening, i.e. cross-linking of the products according to the invention and their mixtures can be achieved by moisture, moist air and gases or substances which split off water, such as hydrates of alcohols, pigments which contain water, chloral hydrate, aldehyde hydrates, inorganic compounds which contain water of crystallization, hydrates of amines and polyamines, etc. In this cross-linking reaction, which can be carried out in a controlled manner, various low-molecular weight aminoalkyl alkoxysilanes and monomeric silicon compounds may be used in addition to serve as chain-lengthening agents or low-molecular weight cross-linking agents, either to increase the degree of cross-linking of the products of the process or to achieve certain particular properties such as increased temperature resistance, reduced tendency to swelling or better bonding on metals, noble metals, alumimium, iron, zinc, glass supports or fabric supports. In the same way, various cross-linking agents known from the chemistry of dimethyl polysiloxanes, such as polyfunctional alkoxy silicon compounds, alkyl triacyloxysilanes and N-silyl-substituted carboxylic acid amides may also be used (see DOS 1 239 041). Catalysts such as dialkyl tin carboxylates, lead salts, tin- (II)-salts of organic carboxylic acids (e.g. tin-(II)-octoate), tert. amines and phosphines may be used. The proportion of these additional chain-lengthening and cross-linking agents used in the products according to the invention may be very high and may easily be up to 60% by weight, based on the products of the process. The following may also be added as less highly reactive chain-lengthening or cross-linking agents: vinyl trichlorosilane, vinyl triethoxysilane, vinyl-tris-($\beta$-methoxyethoxy)-silane, vinyl trimethoxysilane, $\gamma$-methacryloxypropyltrimethoxysilane, $\gamma$-aminopropyl-triethoxysilane, N,N-bis-($\beta$-hydroxyethyl)- $\gamma$-aminopropyl-triethoxysilane, N-$\beta$-aminoethyl$\gamma$-aminopropyl-trimethoxysilane, $\gamma$-glycidoxypropyltrimethoxysilane, $\gamma$-mercaptopropyl-trimethoxysilane and $\gamma$-chloropropyl-trimethoxysilane. Mixtures of less reactive monomers and highly reactive compounds according to the invention can thereby be obtained with adjustable reactivities and pot lives.

Since neither ethoxy silane derivatives nor acyloxy silane derivatives react with polyisocyanates, the compounds according to the invention may also be applied together with any polyisocyanates which can be hardened by atmospheric moisture, alloys of the compounds according to the invention with cross-linked polyureas being obtained.

The new compounds according to the invention and their mixtures enable synthetic resins which can be cross-linked in the cold by moisture to be obtained, e.g. firmly bonding, elastic, very lightfast coatings and lacquers on various metals and noble metals, e.g. by simple and rapid immersion lacquering of metal sheets, formed metal parts, etc., and they also enable elastic and abrasion-resistant semihard or hard synthetic resin lacquers to be produced.

The use of the substances according to the invention for finishing paper, textiles, and foam resins, in particular polyurethane foams, is also an important application. The controlled cross-linking reaction which can be achieved in products of the process which have been stabilized with alcohols and acid additives provides the possibility of particularly elegant methods of application. The activating effect of these acid additives advantageously only comes into play during and after application of the products of the process, i.e. during evaporation of the solvent mixtures which contain alcohols, as described below.

Whereas in closed containers the acid additives insure a constant viscosity of the products of the process, the controlled crosslinking reaction of the compounds according to the invention sets in as soon as the alcohol concentration in the film which is in the process of drying drops in the presence of atmospheric moisture. The crosslinking reaction of the products, which is controlled in the sense that it takes place at a desired point in time and leads to the formation of polysiloxane bridge members, e.g. in the presence of atmospheric moisture, can be so highly accelereated by the acid additives that it is completed within a few minutes in the cold.

the invention is further illustrated but is not intended to be limited by the following examples in which all parts and percentages are by weight unless otherwise specified.

EXAMPLE 1

In this example there is described the linearizing splitting of a cross-linked polyurethane elastomer to form a macropolyisocyanate and the conversion of the macropolyisocyanate to diisocyanate polyaddition products with silyl urea end groups.

The cross-linked polyurethane elastomer was prepared according to a known process (see E. Muller, Die Angewandte Makromolekulare Chemie page 79 (1970): "Aufbau von Urethaneelastomeren hoher Hydrolysebestandigkeit") by reacting 1 mol of a polyester from adipic acid and ethylene glycol with OH-number 56, 3.2 mols of 4,4'-diphenylmethane diisocyanate and 2 mols of butane-1,4-diol (NCO/OH equivalent ratio = 1.066).

100 parts by weight of the cross-linked polyurethane in the form of a granulate are split up in the course of one hour in 400 parts by weight of anhydrous dimethylformamide and 11.1 parts by weight of 1-isocyanato-3,3,5-trimethyl-5-isocyanatomethyl-cyclohexane at 130°C. to yield a completely clear and soluble macropolyisocyanate, only small quantities of the monomeric diisocyanate being used up in the process (less than 0.3 parts by weight). The solution is rapidly cooled to 30°C. and 27.5 parts by weight of $C_6H_{11}$—N—H—$CH_2$—Si(—$OC_2H_5$)$_3$ are added with vigorous stirring.

A completely gel-free, approximately 25.7% solution of a mixture of about 100.5 parts by weight of a high-molecular weight linearized polyurethane with silyl urea end groups and 36 parts by weight of

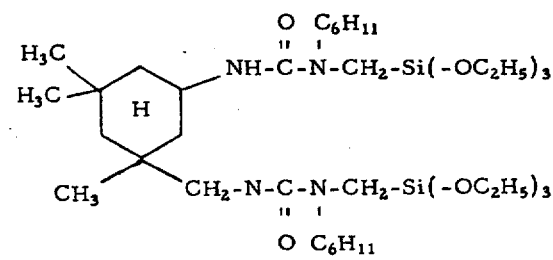

is obtained.

The solution has a viscosity of about 25 poises at 25°C. When the solution is poured out on wood, sheet metal, textile, leather or synthetic resin supports, soft, highly elastic films, lacquers and coatings which have been cross-linked by atmospheric moisture by way of the siloxane groups are obtained; they have high abrasion resistance and folding strength and extremely high chemical resistance and are no longer soluble in hot dimethylformamide.

EXAMPLE 2

The procedure is the same as described in Example 1 but for the linearizing decomposition of the cross-linked polyurethane there are used the following polyisocyanates and modified polyisocyanates in succession:

a. 20 parts by weight of an isocyanate telomer prepared according to DOS 1,720,747 from hexamethylene diisocyanate and vinyl acetate and containing 40% by weight of grafted polyvinyl acetate. NCO-content of the solution: 29%, hexamethylene diisocyanate content: 58% by weight.

b. 12 parts by weight of 4,4'-diisocyanatodicyclohexylmethane c. 5 parts by weight of 4,4'-diisocyanatodiphenylmethane and 2.4 parts by weight of 1-isocyanato-3,3,5-trimethyl-5-isocyanatomethylcyclohexane d. 7.4 parts by weight of 1-methylbenzene-2,4-diisocyanate and 3.5 parts by weight of 1-isocyanato-3,3,5-trimethyl-5-isocyanatocyclohexane.

e. 8.7 parts by weight of hexamethylene diisocyanate
f. 6.5 parts by weight of tolylene-2,4-diisocyanate
g. 4.7 parts by weight of triisocyanatohexyl-biuret
h. 8.4 parts by weight of a urethane triisocyanate obtained from 1 mol of trimethylol propane and 3 mols of hexamethylene diisocyanate
i. 7 parts by weight of a urethane triisocyanate obtained from 1 mol of trimethylol propane and 3 mols of tolylene diisocyanate isomers (ratio of 2,4 isomer to 2,6 isomer = 80 : 20)
j. 15 parts by weight of a solution of 70% by weight of tolylene-2,4-diisocyanate and 30% by weight of trimerized tolylene-2,4-diisocyanate.

Although triisocyanates are used for the linearizing decomposition under g), h), i) and j), soluble, completely uncross-linked and very high molecular weight macropolyisocyanates are obtained in all cases. The clear polyisocyanate mixtures obtained are immediately reacted with an excess of

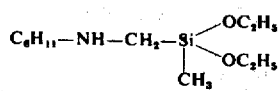

solutions which are highly reactive with moisture and have the following viscosities being obtained:

a) 2 200 cP
b) 3 300 cP
c) 1 100 cP
d) 1 900 cP
e) 1 900 cP
f) 3 200 cP
g) 4 900 cP
h) 3 850 cP
i) 3 200 cP
j) 3 900 cP

EXAMPLE 3

The following cross-linked, highly elastic polyurethanes are used for the linearizing decomposition, the procedure being otherwise exactly the same as described in Example 1:

a. 100 parts by weight of a granulate of a cross-linked polyurethane from 1 mol of polyethylene oxide (molecular weight 2000), 6.4 mols of diphenylmethane-4,4'-diisocyanate and 5.2 mols of butane-1,4-diol; NCO/OH equivalent ratio = 1.03
b. 100 parts by weight of a granulate of a cross-linked polyurethane from 1 mol of polytetrahydrofurane(-molecular weight 2000), 3.2 mols of 4,4'-diisocyanatodiphenylmethane and 2 mols of butane-1,4-diol; NCO/OH equivalent ratio = 1.066.
c. 100 parts by weight of a granulate of a cross-linked elastomer prepared from a polyester from hexane-1,6-diol, neopentyl glycol and adipic acid (molecular weight 2000), 3.2 mols of diphenylmethane-4,4'-diisocyanate and 2 mols of butane-1,4-diol; NCO/OH equivalent ratio = 1.066.
d. 100 parts by weight of a cross-linked elastomer from 1 mol of a caprolactone polyester (molecular weight 2000), 3.2 mols of diphenylmethane-4,4'-diisocyanate and 2 mols of butane-1,4-diol; NCO/OH equivalent ratio = 1.066.
e. 100 parts by weight of a granulate of a cross-linked elastomer from 1 mol of hexane-1,6-diol polycarbonate (molecular weight 2000), 3.2 mols of diphenylmethane-4,4'-diisocyanate and 2 mols of butane-1,4-diol; NCO/OH equivalent ratio = 1.066.

The products obtained in all cases (a) to (e) are polyurethanes which are readily cross-linked via siloxane groups in the presence of moisture. Cross-linked films obtained in (b), (c), (d) and (e) are completely insoluble in boiling dimethylformamide and have excellent resistance to hydrolysis when in the form of coatings, wet strength coverings and microporous foils.

EXAMPLE 4

The following cross-linked polyurethanes and polyurethane ureas are used for linearizing decomposition, the procedure being otherwise exactly the same as described in Example 1.

a. 100 parts by weight of a cross-linked polyurethane from 1 mol of a polyester from adipic acid and ethylene glycol (molecular weight 2000), 1.714 mols of naphthylene-1,5-diisocyanate and 0.444 mols of butane-1,4-diol; NCO/OH equivalent ratio = 1.186.
b. 100 parts by weight of a cross-linked, hard-elastic polyurethane obtained from 1 mol of a polyester of adipic acid and ethylene glycol (molecular weight 2000), 2.857 mols of naphthylene-1,5-diisocyanate and 1.555 mols of butane-1,4-diol; NCO/OH equivalent ratio = 1.222.
c. 100 parts by weight of a cross-linked polyurethane from 1 mol of a polyester from adipic acid and ethylene glycol (molecular weight 2000), 1.714 mols of tolylene-2,4-diisocyanate and 0.444 mols of 3,3'-dichloro-4,4'-diaminodiphenylmethane;

$$\frac{NCO}{(OH + NH_2)} \text{equivalent ratio} = 1.186.$$

d. 100 parts by weight of a cross-linked lightfast polyurethane polyurea obtained from 1 mol of a polyester of adipic acid and ethylene glycol (molecular weight 2000), 2 mols of 1-isocyanato-3,3,5-trimethyl-5-isocyanato-methyl-cyclohexane and 0.92 mols of 1-amino-3,3,5-trimethyl-5-aminomethyl-cyclohexane;

$$\frac{NCO}{(OH + NH_2)} \text{equivalent ratio} = 1.0416$$

e. 100 parts by weight of a cross-linked, lightfast polyurethane-polyhydrazodicarbonamide obtained from 1 mol of a polyester of adipic acid and ethylene glycol (molecular weight 2000), 2 mols of 1-isocyanato-3,3,5-trimethyl-5-isocyanatomethyl-cyclohexane and 0.92 mols of hydrazine;

$$\frac{NCO}{(OH + NH_2)} \text{equivalent ratio} = 1.0416$$

f. 100 parts by weight of a cross-linked, lightfast polyurethane polyurea obtained from 1 mol of a polyester of adipic acid and ethylene glycol (molecular weight 2000), 4 mols of 1-isocyanato-3,3,5-trimethyl-5-isocyanato-methyl-cyclohexane and 2.6 mols of 1-amino-3,3,5-trimethyl-5-aminomethyl-cyclohexane;

$$\frac{NCO}{(OH + NH_2)} \text{equivalent ratio} = 1.111$$

g. 100 parts by weight of a cross-linked polyurethane obtained from 1 mol of a polyester of adipic acid and ethylene glycol (molecular weight 2000), 3 mols of diphenylmethane-4,4'-diisocyanate, 0.2 mols of dimeric tolylene-2,4-diisocyanate and 2 mols of butane-1,4-diol; NCO/OH equivalent ratio = 1.066.

In all cases (a) to (g) a mixture of 400 parts by weight of anhydrous dimethylformamide and 11.1 parts by weight of 1-isocyanato-3,3,5-trimethyl-5-isocyanatomethylcyclohexane is used for linearizing decomposition at 140°C.

Clear solutions of macropolyisocyanates mixed with unchanged 1-isocyanato-3,3,5-trimethyl-5-isocyanatomethylcyclohexane are obtained.

These solutions are subsequently reacted with an excess of the following aminoalkyl silane derivative at 30°C:

a. 0.1 mol $C_6H_{11}-NH-CH_2-Si(-OC_2H_5)_3$

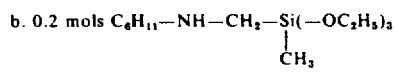

c. 0.2 mols $H_2N-CH_2-CH_2-NH-CH_2-Si(-OC_2H_5)_3$
d. 0.2 mols $H_2N-CH_2-CH_2-CH_2-Si(-OC_2H_5)_3$
e. 0.1 mol $C_6H_{11}-NH-CH_2-Si(-OC_4H_9)_3$

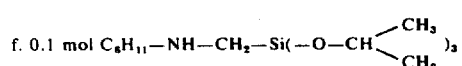

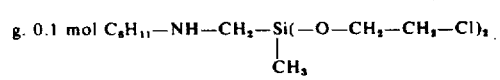

In all the reaction mixtures a) to g) there are obtained clear, gel-free polyaddition products which are reactive with moisture and which have the following viscosities in the form of 25% solutions:

a. 11 800 cP
b. 12 350 cP
c. 11 500 cP
d. 19 500 cP
e. 12 650 cP
f. 22 900 cP
g. 14 500 cP

EXAMPLE 5

244.4 parts by weight of an α,ω-diisocyanatoprepolymer obtained from 1 mol of a polyester of adipic acid and ethylene glycol (molecular weight 2000) and 2 mols of 1-isocyanato-3,3,5-trimethyl-5-isocyanatomethylcyclohexane are first dissolved in 800 parts by weight of dimethylformamide and the solution is then reacted at room temperature with a solution of 16.5 parts by weight of 1-amino-3,3,5-trimethyl-5-aminomethylcyclohexane in 220 parts by weight of dimethylformamide to yield a high-molecular weight polyurethane polyurea (20% solution). This solution is diluted with 400 parts by weight of dimethylformamide. 100 parts by weight of the cross-linked granulate f) of example 4 are then introduced and 8.4 parts by weight of hexamethylene diisocyanate added. The temperature is raised to 150°C. and a clear solution of macropolyisocyanates and monomeric hexamethylene diisocyanate is obtained after 1 hour. 25 parts by weight of $C_6H_{11}-NH-CH_2-Si(-OC_2H_5)_3$ are added with vigorous stirring. The resulting mixture, which is highly reactive with moisture is cross-linked to completely insoluble, lightfast films within 10 minutes in air.

This example shows that the linearizing decomposition of cross-linked diisocyanate polyaddition products to produce macropolyisocyanates can even be carried out in the presence of dissolved polyurethane polyurea which have a high urea group concentration without the reaction mixtures being cross-linked and gelled by the monomeric polyisocyanates.

EXAMPLE 6

This example illustrates that the process of linearization according to the invention can easily be applied to foam resins which are cross-linked via biuret groups and allophanate groups as well as to cross-linked microporous foils. The following reactants are used for linearizing decomposition:

a. 100 parts by weight of a cross-linked microporous foil from 1 mol of a polyester of adipic acid and ethylene glycol (molecular weight 2000).714 mols of 4,4'-diisocyanatodiphenylmethane and 0.444 mols of tolylene-2,4-diamine;

$$\frac{NCO}{(OH + NH_2)} \text{equivalent ratio} = 1.186.$$

b. 100 parts by weight of a cross-linked foam resin (foam flakes) obtained from 87 parts by weight of a linear propylene glycol polyether with an average molecular weight of 2000 (OH-number 56), 2.7 parts by weight of water, 1.0 part by weight of a polyether polysiloxane, 0.2 parts by weight of endoethylene piperazine, 0.2 parts by weight of a tin-(II) salt of 2-ethyl caproic acid and 36.3 parts by weight of tolylene diisocyanate (80% 2,4-and 20% 2,6-isomer). Unit weight 37 kg/m³.

$$\frac{NCO}{(OH + H_2O)} \text{equivalent ratio} = 1.066.$$

Linearization is completed in the course of 1 hour at 145°C. as in example 1. Clear solutions with a solids content of about 25% by weight are obtained from which cross-linked, optionally microporous foils, films and coatings with excellent strength can be produced. If the Si-monomer from example 1 is added in a quantity of 0.15 to 0.2 mols, mixtures which are stable in storage are obtained in which the unbound Si-monomers take over the function of chain-lengthening or cross-linking agents. The Si-content of the cross-linked end products can be greatly increased by this method and when this is done, their bond strength on glass and ceramic supports is significantly increased.

EXAMPLE 7

This example explains the possibility of using the products of the process in matrix reactions in accordance with the method described in Belgian Pat. No. 746,982. Thus, for example small quantities of moisture present in open-celled polyurethane foams are sufficient to effect rapid cross-linking of the products of the process and cause them to be arranged in an open-celled cross-linked form in the cellular spaces which have been newly formed or expanded by the swelling pressure.

A polyurethane foam block produced in accordance with example 1 of Belgian Pat. No. 769,002 and measuring 30 × 15 × 5 cm (=83.3 parts by weight) is saturated with 1000 parts by weight of the solution of polyurethanes with silylized urea groups prepared according to example 1 of the present application, pressed out, again saturated and then only lightly stripped off to remove solution not adhering to it. This pretreated foam is then dried in a vacuum at 75°C. 170 parts by weight of a highquality, completely non-sticky, very elastic foam is obtained in this way, which has a unit weight of about 76 kg/m³ and which compared with the starting material contains more than 100% by weight of cellular polyurethanes cross-linked via siloxane groups and which is greatly improved in its mechanical strength and elasticity.

80 parts by weight of high-bulk foam flakes, for example, may be impregnated in the same way and compressed in a mold so that by virtue of the high adhesive power of the products of the process the flakes will be converted by this compression into porous, rubber-like molded parts which will preserve their given shape after removal of the solvent.

EXAMPLE 8

This example explains the preparation of macropolyisocyanates by linearizing splitting of cross-linked diisocyanate polyaddition products and their statistical unilateral reaction with α-aminomethylsilane derivative. The modified products condense in the presence of traces of water in polar solvents, undergoing siloxane group formation and being converted into polymers with comb structures which have extremely high bonding power on glass fibers.

100 parts by weight of a cross-linked, lightfast polyurethane polyurea prepared by the casting process from 1 mol of a polyester of adipic acid and ethylene glycol (molecular weight 2000), 3.2 mols of 1-isocyanato-3,3,5-trimethylcyclohexane and 2 mols of 1-amino-3,3,5-trimethyl-5-aminomethylcyclohexane $$\frac{NCO}{(OH + NH_2)} \text{equivalent ratio} = 1.066$$

are mixed with a solution of 225.7 parts by weight of an α,ω-diisocyanato-polyester-polyurethane-polyurea in 1196 parts by weight of dimethylformamide and left to swell at room temperature. This high molecular weight α,ω-diisocyanato-polyester-polyurethane-polyurea has an average molecular weight of about 10 350 and was prepared from 1 mol of a polyester of adipic acid, hexane-1,6-diol and neopentyl glycol (molecular weight 1680) and 2 mols of 1-isocyanato-3,3,5-trimethyl-5-isocyanatomethyl-cyclohexane as chain-lengthening agent.

$$\frac{NCO}{(OH + NH_2)} \text{equivalent ratio} = 1.122.$$

The cross-linked granulate which has been left to swell at room temperature is split up into a macropolyisocyanate by leaving it for 1½ hours at 140°C. in the presence of 11.1 parts by weight of 1-isocyanato-3,3,5-trimethyl-5-isocyanato-methyl-cyclohexane. It is cooled to 30°C. and a solution of 10 parts by weight of

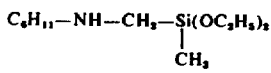

dissolved in 200 parts by weight of isopropanol or tert. butanol is stirred in. The NCO-groups of the macrodiisocyanate mixture and the NCO-groups of the monomeric low-molecular weight diisocyanate are thereby statistically only reacted unilaterally:

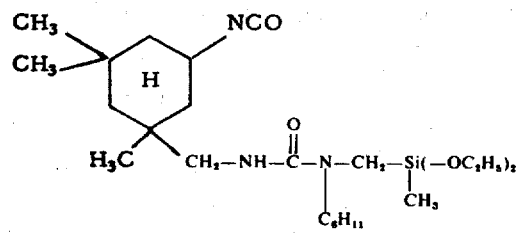

The initial viscosity of the approximately 20 % by weight solution is 2500 cP. Owing to the large excess of isopropanol, the remaining NCO-groups react to form unreactive urethane groups while the

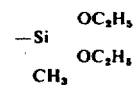

-end groups of the macrosilyl ureas undergo condensation with a total of about 0.8 g. of $H_2O$ present in the total quantity of solvent to form polysiloxanes with a "comb structure"

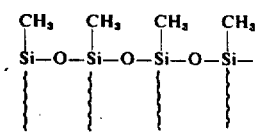

A viscosity of 55 000 centipoises is reached after 48 hours at room temperature. The mixture forms films which adhere exceptionally firmly on glass supports and glass fibers.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the preparation of a synthetic resin capable of being cross-linked by moisture which comprises reacting, in a first step, a high molecular weight isocyanate polyaddition product cross-linked via allophanate, biuret or uretone imine groups in a polar solvent with a low molecular weight polyisocyanate at a temperature of 90° to 200°C and then reacting the resulting linearized product with an amino alkyl silane selected from a group consisting of (I) 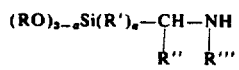

or (II) 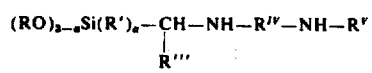

or (III)
$$(RO)_{3-a}Si(R')_a-CH_2-(CH_2)_n-NH-R'''$$

wherein

R represents a $C_1$-$C_{18}$ alkyl or $C_4$-$C_{14}$ cycloalkyl radical or a phenyl radical, R' represents an optionally halogenated or cyanosubstituted $C_1$-$C_{10}$ alkyl, $C_4$-$C_{10}$ cycloalkyl or $C_6$-$C_{10}$ aryl radical, R'' represents a hydrogen atom or a methyl or phenyl radical, R''' represents a hydrogen atom or an optionally halogenated or cyanosubstituted $C_1$-$C_{18}$ alkyl, $C_4$-$C_{14}$ cycloalkyl or $C_6$-$C_{14}$ aryl radical, $R^{IV}$ represents a divalent aliphatic, cycloaliphatic, araliphatic or aromatic hydrocarbon radical containing 2 to 16 carbon atoms, $R^V$ represents hydrogen or $$-\underset{\underset{R''}{|}}{C}H-\underset{\underset{(R')_a}{|}}{Si}(-OR)_{3-a}$$

$a$ = 0, 1 or 2 and $n$ = 1-7, said polar solvent being selected from the group consisting of dimethyl formamide, dimethyl acetamide, tetramethyl urea, dimethyl sulphoxide, N-methyl pyrrolidone, glycol carbonate, caprolactone and butylactone.

2. The process of claim 1 wherein said amino alkyl silane is $C_6H_{11}-NH-CH_2-Si(-OC_2H_5)_3$.

3. The process of claim 1 wherein said amino alkyl silane is

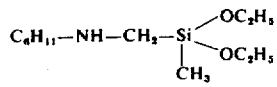

4. The process of claim 1 wherein said isocyanate polyaddition product has a molecular weight of from about 20,000 to about 80,000.

5. The process of claim 1 wherein said reaction is carried out at a temperature of from about 110° to about 140°C.

6. The process of claim 1 wherein said reaction is carried out in the presence of polar solvent soluble high-molecular weight polyaddition products which are not cross-linked.

7. The process of claim 1 wherein a quantity of aminoalkyl silane is used only sufficient to react with part of the NCO groups of said linearized product, water, monoamine, or alcohol impurities in the solvent reacting with the balance of said NCO groups.

8. The process of claim 1 wherein said low-molecular weight polyisocyanate is tetramethylene diisocyanate, hexamethylene diisocyanate, 1-isocyanato-3,3,5-trimethyl-5-isocyanatomethyl-cyclohexane, m- and p-xylylene diisocyanate, tolylene diisocyanate (2,4- and 2,6-), 4,4'-diisocyanatodiphenylmethane and products thereof which are hydrogenated in the nucleus, naphthylene-1,5-diisocyanate or the modification products obtained by trimerization of the above-mentioned diisocyanates.

9. The product of the process of claim 1.

* * * * *